(12) United States Patent
Sandström et al.

(10) Patent No.: US 6,381,687 B2
(45) Date of Patent: Apr. 30, 2002

(54) FLEXIBLE MEMORY CHANNEL

(75) Inventors: Stefan Sandström, Eslöv; Stefan Lundberg, Lund, both of (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 09/252,173

(22) Filed: Feb. 18, 1999

(30) Foreign Application Priority Data

Dec. 23, 1998 (SE) ................................. 9804529

(51) Int. Cl.⁷ ................................. G06F 12/00
(52) U.S. Cl. ...................... 711/213; 711/219
(58) Field of Search ................ 711/217, 218, 711/219, 213, 131, 140

(56) References Cited

U.S. PATENT DOCUMENTS

| | | | |
|---|---|---|---|
| 5,586,282 A | * | 12/1996 | Iino et al. .................... 711/5 |
| 5,911,153 A | * | 6/1999 | Dhong et al. ................ 711/218 |
| 5,940,876 A | * | 8/1999 | Pickett ........................ 711/220 |
| 6,055,622 A | * | 4/2000 | Spillinger ................... 712/207 |

* cited by examiner

*Primary Examiner*—Matthew Kim
*Assistant Examiner*—Christian P. Chace
(74) *Attorney, Agent, or Firm*—Charles C. Cary; Cary & Kelly, LLP

(57) ABSTRACT

A memory channel means transferring data streams between different blocks and an internal memory means on a data chip, wherein said memory channel means comprises several memory channels. Each channel has source and destination data stream interfaces, wherein each interface is connectable to different blocks, and a flexible address generator generating source and destination addresses for the internal memory means, wherein the order of the data being transferred is changed.

13 Claims, 6 Drawing Sheets

Basic examples of stride usage: (Strides enabled if used)

| NO | CTRL | PTR | STR0 | CNT1 | STR1 | CNT2 | STR2 | CNT3 | STR3 | RESULTS |
|---|---|---|---|---|---|---|---|---|---|---|
| #1 | 0X1 | 0X10 | 0 | | | | | | | 0x10 0x10 0x10 |
| #2 | 0X1 | 0X10 | 1 | | | | | | | 0x10 0x11 0x12 |
| #3 | 0X1 | 0X10 | 0x10 | | | | | | | 0x10 0x20 0x30.... |
| #4 | 0X1 | 0X10 | -1 | | | | | | | 0x10 0x0f 0x0e.... |
| #5 | 0X3 | 0X10 | 1 | 5 | -5 | | | | | 0x10 0x11.... 0x15<br>0x10 0x11.... 0x15<br>... |
| #6 | 0X3 | 0X10 | 1 | 5 | 0xb | | | | | 0x10 0x11.... 0x15<br>0x20 0x21.... 0x25<br>... |
| #7 | 0X7 | 0X10 | 1 | 1 | 0xf | 1 | 0x1f | | | 0x10 0x11, 0x20 0x21,<br>0x40 0x41, 0x50 0x51,<br>... |

FIG. 5

MC1-6  Memory channel 1-6 (1-3 advanced, 4-6 simple)
DCT    DCT
Q      Quantization
BS     Bit streamer
EMEM   External memory interface
BLIT   Blitter
CCD    CCD interface
VIDI   Video in interface

| Destinations / Sources | MC1 | MC2 | MC3 | MC4 | MC5 | MC6 | DCT | Q | BS | EMEM | BLIT A | BLIT B | ACDC | HOST |
|---|---|---|---|---|---|---|---|---|---|---|---|---|---|---|
| MC1 |  | x |  |  |  |  |  |  |  |  |  |  |  |  |
| MC2 |  |  |  |  |  |  | x |  |  |  |  |  | x |  |
| MC3 |  |  |  |  |  |  |  |  |  | x | x |  | x |  |
| MC4 |  |  |  |  | x |  |  |  |  |  |  |  |  |  |
| MC5 |  |  |  |  |  | x |  |  |  |  | x |  | x |  |
| MC6 |  |  |  |  |  |  |  |  | x |  |  |  |  |  |
| BS |  |  |  |  |  |  | x |  |  |  |  |  |  |  |
| EMEM |  |  | x |  |  |  |  |  |  | x |  |  |  |  |
| CCD | x | x | x |  |  |  |  |  |  |  |  |  |  |  |
| VIDI |  |  | x |  |  |  |  |  |  |  |  |  |  |  |
| ACDC |  |  |  | x |  |  |  |  |  |  |  |  |  |  |
| BLIT | x |  |  | x |  |  |  |  |  |  |  |  |  |  |
| HOST |  |  |  |  |  |  |  |  |  |  |  |  |  |  |

FIG. 6

FLEXIBLE MEMORY CHANNEL

PRIORITY CLAIMED

This application claims the benefit of priority to Swedish Application No. 9804529-7, filed on Dec. 23, 1998, entitled, Flexible Memory Channel, which is incorporated by reference as if fully set forth herein.

BACKGROUND OF INVENTION

1. Field of the Invention

The present invention relates generally to memory channel means, and more particularly to memory channel means comprising several memory channels transferring data streams between different blocks and an internal memory means on a data chip.

2. Description of the Prior Art

General purpose and special purpose chips comprise many different blocks such as a CPU, control circuits, I/O-ports, memory units, registers etc., exchanging data, usually by means of an internal bus. A bus is a set of connectors designed to transfer data either unidirectionally or bidirectionally. Some buses are dedicated buses, i.e. buses having a unique source and destination. Thus, if n blocks have to be interconnected by buses in all possible ways, n(n−1) dedicated buses are required. Generally, bus drivers and logic circuits are required to control the buses. These designs involve considerable costs, and therefore buses which can connect one of several sources to one of several destinations are used. However, this design with fewer buses requires more complex logic circuits and bus controllers.

Traditional buses are classified as CPU-memory buses or I/O buses. I/O buses may be lengthy and interconnect many types of devices, having a wide range in the data bandwidth of the devices. On the other hand CPU-memory buses are short, high speed buses and designed to maximize CPU-memory bandwidth. Also single buses for both memory and I/O devices are available.

DCAM™-101 from LSI Logic Corporation is a special purpose chip for digital still cameras. It contains different functions needed to preview, capture, compress, filter, store, transfer and display digital images. Consequently, the DCAM™-101 chip comprises several blocks and units, such as a CPU, memory units, different I/O interfaces, and control blocks etc., all of which exchange data through a traditional internal bus.

Such a traditional bus enables only passive transmission of data between different blocks on the chip, i.e. the data is not manipulated in any way during the transfer.

SUMMARY OF THE INVENTION

The main object of the present invention is to provide an improved memory channel means in order to move data streams between different blocks on a chip and simultaneously manipulate the data being transferred.

Another object of the invention is to change the order of the data within the data streams.

A further object of the invention is to provide an improved memory channel means, which reduces the required memory capacity on the chip.

Still another object of the invention is to obtain regular addressing schemes.

An additional object of the invention is to provide memory channels and address generators operating in parallel and accessing the memory independent of each other.

These and other objects, features and advantages of the invention are accomplished by a flexible memory channel means according to the invention, comprising several memory channels, each channel having source and destination data stream interfaces, wherein each interface is connectable to different blocks, and a flexible address generator generating source and destination addresses for the internal memory, and will be apparent from the following detailed description in conjunction with the drawings.

BRIEF DESCRIPTION OF THE DRAWINGS

In order to explain the invention in more detail and the advantages and features of the invention references in the following detailed description of the preferred embodiment are made to the accompanying drawings, in which FIG. 5 is a table illustrating the method of address generation by the second embodiment of the address generator according to the invention, and FIG. 6 is a table illustrating possible connections between data sources and destinations on the special purpose chip in FIG. 1.

DETAILED DESCRIPTION OF THE INVENTION

The present invention is a flexible memory channel means, transferring data streams between different blocks and an internal memory means on preferably a special purpose chip such as a chip for a digital imaging system.

The chip for a digital imaging system serves only to illustrate an application for an embodiment of the flexible memory channel means according to the invention. Other embodiments of the invention are applicable to other applications. Further, in the following description, numerous specific details, such as the number of channels, registers, bits in each register and the different blocks on the chip are provided in detail in order to give a more thorough description of the present invention. However, it will be obvious for those skilled in the art that the present invention may be practiced without these specific details. Some well-known features are not described in detail so as not to make the present invention unclear.

Figure 1:
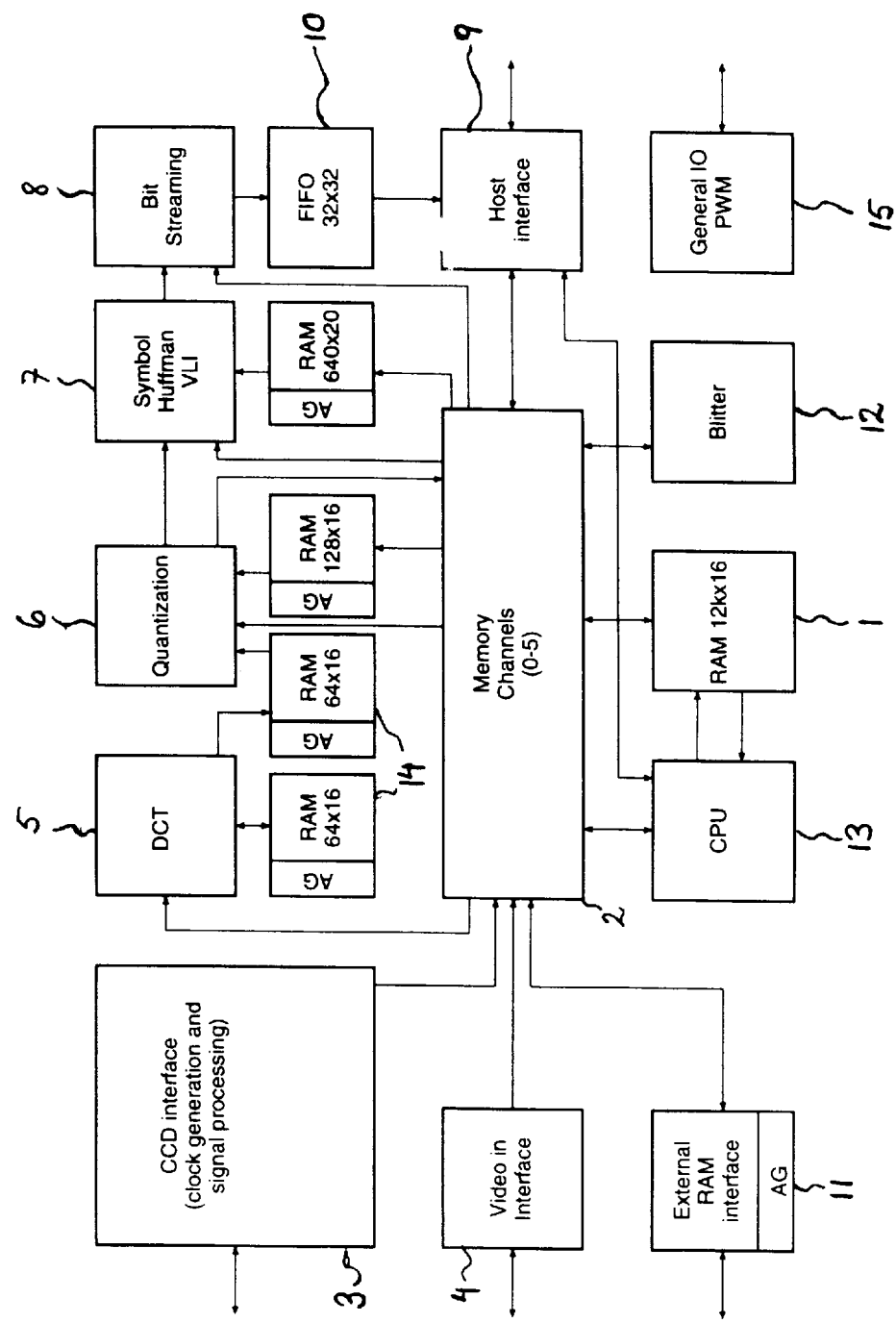
FIG. 1 is a block diagram of a special purpose chip comprising a flexible memory channel means according to the invention.

As shown in FIG. 1 a special purpose chip such as a chip for a digital imaging system comprises different blocks capable of compressing color images from a CCD camera or video source using a compression algorithm such as JPEG. Most of the blocks on the chip operate as data sources, data destinations or both.

Figure 2:
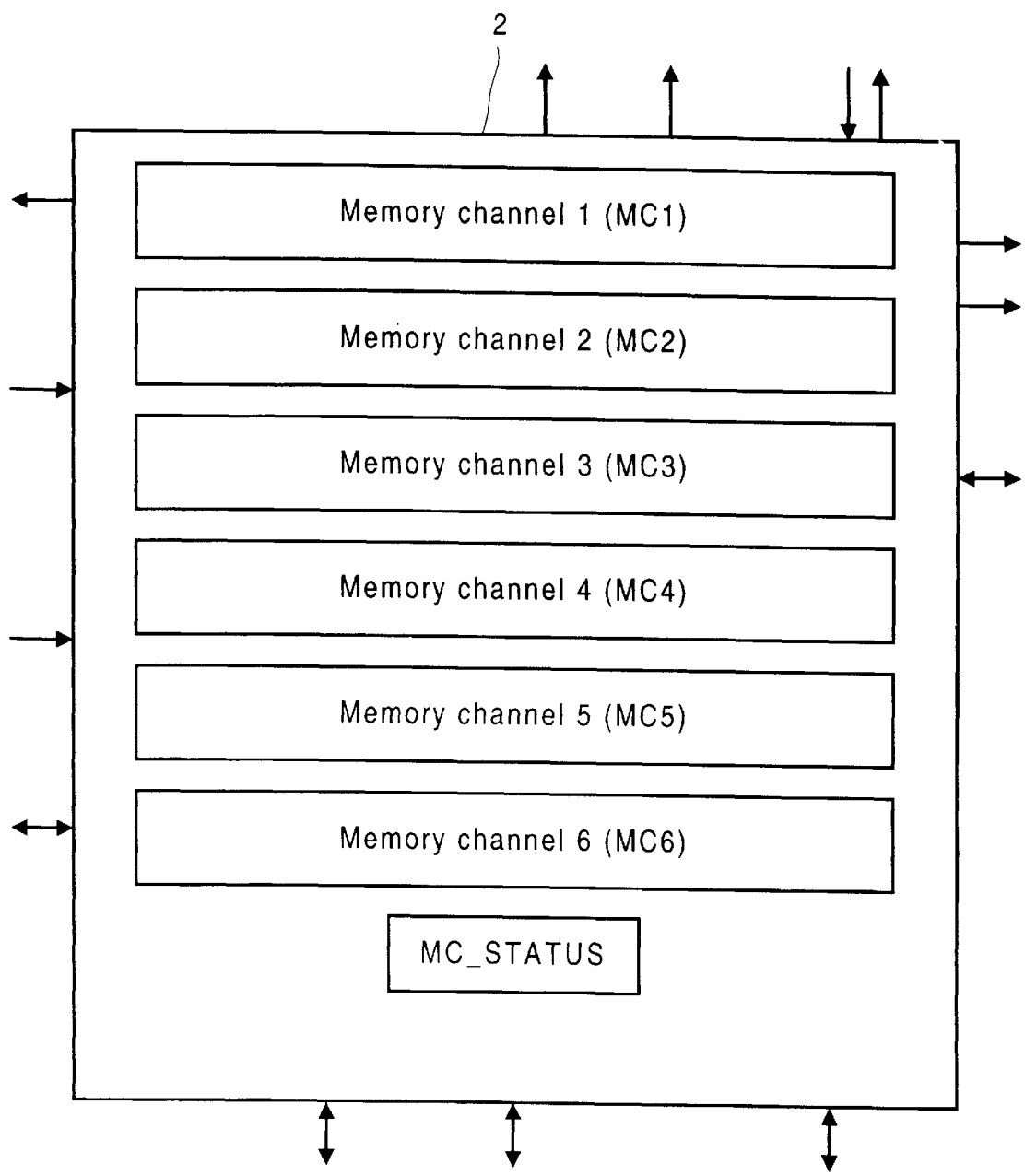
FIG. 2 is a block diagram of an embodiment of the memory channel means in FIG. 1 in further detail.

An internal memory means or RAM 1 is accessed through a memory channel means 2 according to the invention, comprising several memory channels, MC1–MC6 in the embodiment. Each channel has source and destination data stream interfaces, each interface being connectable to different blocks, and a flexible address generator generating source and destination addresses for the internal memory. For example, input data are received via a CCD interface 3 or video interface 4, wherein the data are stored in the internal RAM 1 via the destination data stream interface of the first memory channel MC1, shown in FIG. 2. Further, the stored data are read by a DCT (Discrete Cosine Transform) block 5 from the RAM 1 via the source data stream interface of the second memory channel MC2 for transformation into DCT coefficients and quantization in a quantization block 6. Then, the quantized coefficients are the subject for variable length integer coding and Huffman entropy coding in a Symbol Huffinan VLI block 7. The resulting symbols are converted into a bit stream in a bit stream block 8 and before the data stream is output to an external host via a host interface 9 the data stream is buffered in a FIFO block 10. The data stream is not necessarily transferred to an external host, but is stored in the RAM 1 via the destination data stream interface of the fourth memory channel MC4 for later retrieval.

Some image operations require external memory support. Overloading of still images, such as putting a clock on the image, implies external memory accesses, wherein data are read from the external memory via an external RAM interface 11 and stored in the RAM 1 via for example the destination data stream interface of the second memory channel MC2. The overload operation is performed by a blitter 12. Image data are read from the RAM 1 via the source data stream interface of either of the second and the third memory channels MC2 and MC3, and the data are manipulated by the blitter 12 and stored back in the RAM 1 via the destination data stream interface of the first and fourth memory channels MC1 and MC4.

In order to control the memory channel means 2, the RAM 1 and the other blocks on the chip, an on chip CPU 13, is provided.

Additional memory units or RAMs 14 are provided for support of some of the blocks in order to make them operate properly and a general I/O interface 15 is also provided for the communication between the chip and other external I/O devices.

Figure 3A:
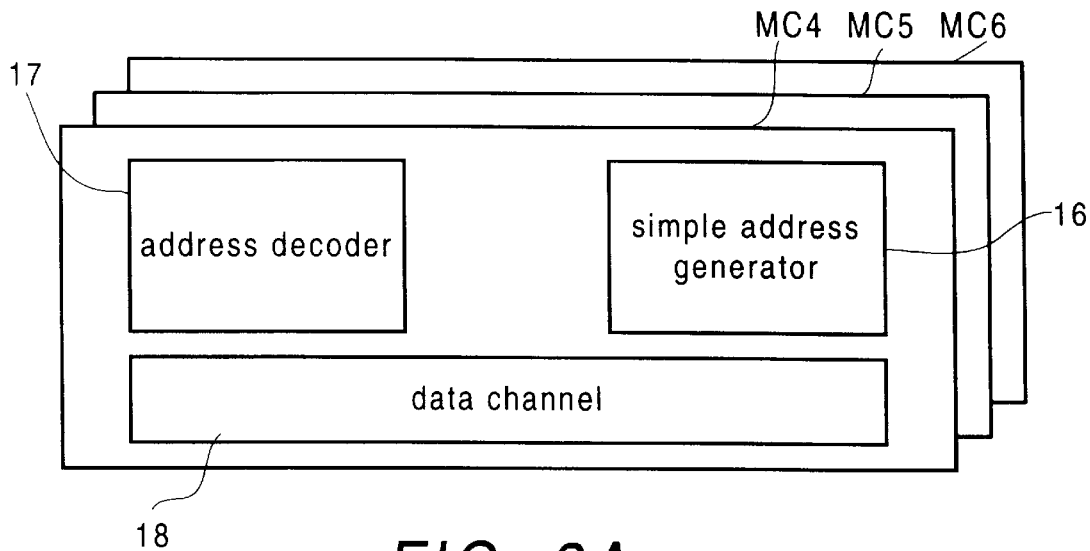
FIG. 3A is a block diagram of a first embodiment of a memory channel according to the invention.
Figure 3B:
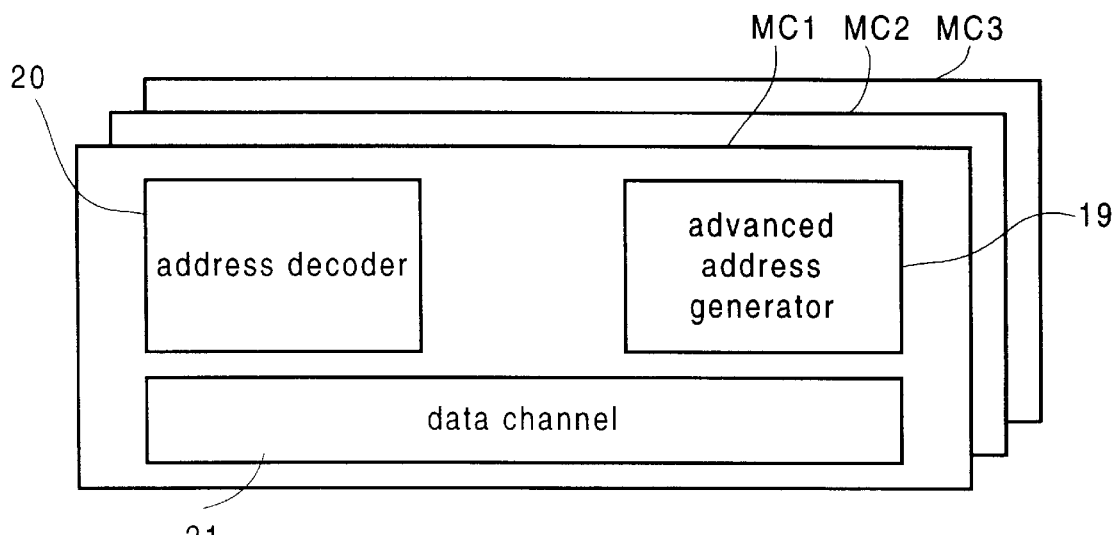
FIG. 3B is a block diagram of a second embodiment of a memory channel according to the invention.

As mentioned above, access to the internal RAM 1 is made through the memory channel means 2 according to the invention, comprising six memory channels in the embodiment. Each memory channel has at least two data stream interfaces-a source and a destination-and an associated address generator. The first, second and third memory channels MC1, MC2, and MC3 are provided with advanced address generators, while the fourth, fifth and sixth memory channels MC4, MC5, and MC6 are provided with simple address generators. An embodiment of the memory channels MC4–MC6 provided with a simple address generator 16, an address decoder 17, and a data channel 18 is illustrated in FIG. 3A, and an embodiment of the memory channels MC1–MC3 provided with an advanced address generator 19, an address decoder 20, and a data channel 21 is illustrated in FIG. 3B. Additionally, each memory channel comprises control means, software and/or hardware for a suitable operation. This is, however, obvious for the man skilled in the art.

The simple address generator generates consecutive source and destination addresses, while the advanced address generator provides more complicated address schemes.

All address generators of the same kind—simple or advanced—have the same set of registers MCx_Yyyy, wherein MCx is the Memory Channel x (x:1–3 for advanced and 4–6 for simple generators) and YYYy is the kind of register.

Figure 4A:
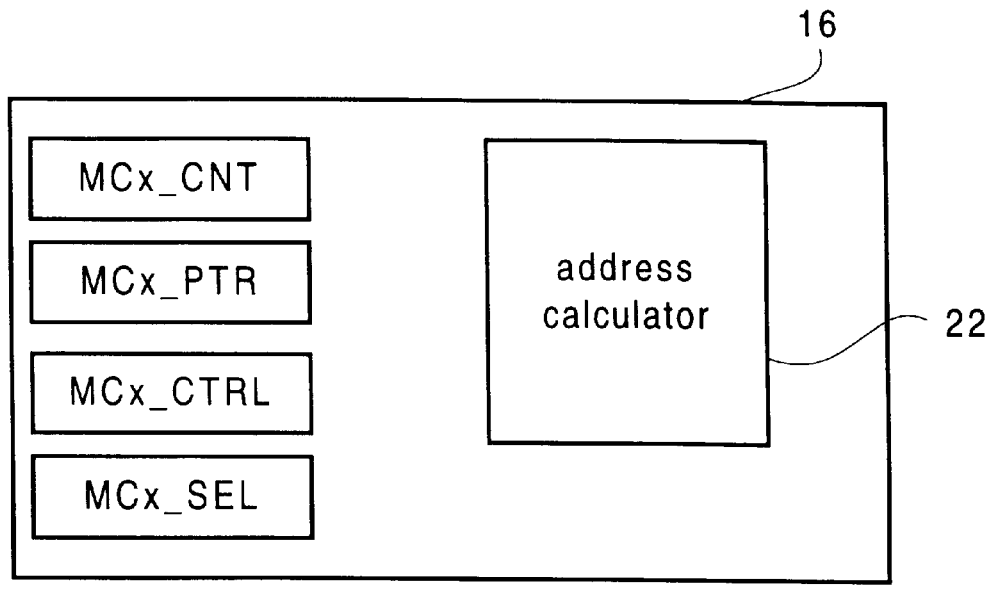
FIG. 4A is a block diagram of a first embodiment of an address generator according to the invention.
Figure 4B:
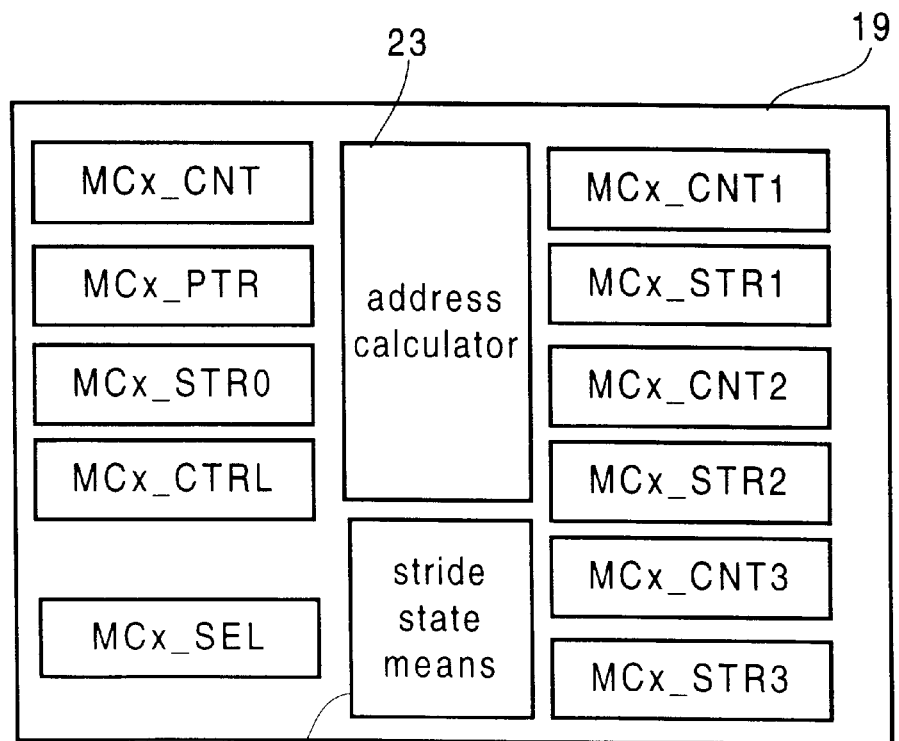
FIG. 4B is a block diagram of a second embodiment of an address generator according to the invention.

In the preferred embodiment of the invention the following registers are available in the advanced address generator 19 and the simple address generator 16, respectively, also shown in FIGS. 4A and 4B. Additionally, an address calculator 22 is provided in the simple address generator 16 and an address calculator 23 is provided in the advanced address generator 19. Further, it is obvious for the man skilled in the art that each address generator comprises control means, software and/or hardware for a suitable operation.

Advanced address registers (1–3)

| | |
|---|---|
| MCx_CNT: | word counter (number of words to be transferred) |
| MCx_PTR: | address pointer (current address) |
| MCx_STR0: | stride value 0 |
| MCx_CTRL: | control register |
| | bit 0 - source/destination control |
| | 1 - destination |
| | 0 - source |
| | bit 1 - minor stride enable |
| | bit 2 - major stride enable |
| | bit 3 - mega stride enable |
| MCx_CNT1: | minor count (number of consecutive accesses) |
| MCx_STR1: | minor stride (added to the address pointer MCx_PTR every minor count access) |
| MCx_CNT2: | major count (number of consecutive minor cycles) |
| MCx_STR2: | major stride (added to the address pointer MCx_PTR after major count minor cycles) |
| MCx_CNT3 | mega count (number of consecutive major cycles) |
| MCx_STR3 | mega stride (added to the address pointer MCx_PTR after mega count major cycles) |
| MCx_SEL | source/destination selection |

Simple address registers (4–6)

| | |
|---|---|
| MCx_CNT: | word counter (number of words to be transferred) |
| MCx_PTR: | address pointer (current address) |
| MCx_CTRL: | control register |
| | bit 0 - source/destination control |
| | 1 - destination |
| | 0 - source |
| MCx_SEL | source/destination selection |

Thus, three different stride registers MCx-STR1, MCx_STR2 and MCx_STR3 can be loaded with stride values. The values are used by the address calculator 23 in the address generator 19 in order to provide the next address depending on the state of the stride unit. The state is controlled by three different stride counters, counting each time the address is updated and the subsequent lower stride counter is zero. When the counter is zero the counter is reloaded with a pre-stored start value. This is repeated until the transmission is completed, which is controlled by the current memory channel MC1–MC6. All registers are loaded in a particular order.

The following order is preferred:
1. Load a stride 0 register MCx_STR0
2. Load a stride setting register MCx_CTRL
3. Load all (used) counter and stride registers MCx_CNT1, MCx_STR1, MCx_CNT2, MCx_STR2, MCx_CNT3, and MCx_STR3.
4. Load a destination pointer register MCx_PTR.
5. Start the data transfer with the MCx_CNT register.

When a value is written in the MCx_PTR register all stride counters are reloaded to an initial state. Further, when the MCx_CNT register is written a first stride update is pre-calculated in order to be ready when the memory channel starts the data transfer. This pre-calculation is performed, because the updated signal is received when the first address already is used. The update signal is generated by the memory channel when the channel has written the first transferred word in the RAM 1.

After a complicated data transfer involving an advanced address generator 19 and the stride registers MCx_STR1–3 and when the channel is ready more words can be transferred by writing in the MCx_CNT again. In this case the internal state for all the stride registers is preserved and the transfer continues. The state is restored if MCx_PTR is written before MCx_CNT is written.

The word counter MCx_CNT of the memory channel counts the number of received words from the source—block or memory—and not the number of transferred words. Since the memory channel has a FIFO means, comprising a two step queue in the embodiment the counter value of the MCx-CNT does not give a reliable indication of a completed transfer. Therefore, the memory channel means 2 is provided with a memory channel status register MC_STATUS of 6 bits, wherein each bit is associated with a particular memory channel, e.g. bit 0 is associated with the first memory channel MC1. The bit is set if the transfer has been completed, or has not been initiated, and the bit is not set if a transfer is in progress.

As mentioned above, access to the RAM 1 is performed by means of the memory channel means 2 and its memory channels having source and destination data stream interfaces, respectively, and its address generators.

The simple address generator is capable of generating consecutive addresses. In order to initiate a data transfer between one of the blocks 3–15 and the RAM 1 on the chip, a transfer only requiring a simple address generation, a start address is generated and written in the MCx_PTR register and a start value is written in the word counter MCx_CNT. The data transfer progresses on a word by word basis in the embodiment. When the transfer is complete the associated bit in the memory channel status register MC-STATUS is set.

In case of more complicated address schemes a memory channel provided with an advanced address generator (1–3) is used. The advanced address generator comprises counter means, wherein each counter means is associated with a stored stride value. The first counter means including the first counter register MCx_CNT1 is decremented for every word transferred until it reaches zero, wherein a corresponding stride value stored in the first stride register MCx_STR1 is added to the current address in the address register MCx_PTR. A stride state means generates control signals for the counter registers. The first counter register MCx_CNT1 is reloaded with a predetermined value. At least one other counter is decremented every time its previous counter means reaches zero, wherein its associated stride value is added to the current address in the address register MCx_PTR and the consecutive counter means is reloaded with a predetermined value. In the preferred embodiment of the invention two additional counters MCx_CNT2 and MCx_CNT3 are provided, as described above. Hence, when MCx_CNT1 becomes zero the second counter MCx_CNT2 is decremented. The MCx-CNT3 is decremented when the second counter becomes zero. If no one of the counters MCx_CNT1, MCx_CNT2 or MCx_CNT3 is zero a stride value stored in another stride register MCx-STR0 is added to the current address in the address register MCx-PTR.

The address generator receives an update signal from the memory channel one cycle after the address is used, hence, the address is generated one cycle in advance.

A few examples of address generations by means of an advanced address generator provided with stride registers are shown in a table 1 in FIG. 5 and possible connections between data sources and destinations are illustrated by examples in a table 2 in FIG. 6.

Each memory channel MC1–MC6 operates in two different modes, source and destination. In a memory channel operating in the destination mode data is received from a block and transferred to the RAM 1. For each word transferred an update signal is generated in the memory channel and is sent to the address generator. A transfer counter in each memory channel counts the number of words read from the block connected to the particular channel into a FIFO queue means in the memory channel. As long as data is present in the FIFO the memory channel requests for a memory cycle and the address generator generates the next address. When a memory cycle is available for the memory channel a signal is received from a memory controller.

In source mode the transfer counter counts the number of words read from the current memory channel into the FIFO. As long as data is present in the FIFO it is transferred to the connected block with a data rate suitable for the block.

Although the invention has been described by way of a specific embodiment thereof it should be apparent that the present invention provides a flexible memory channel that fully satisfies the aims and advantages set forth above, and alternatives, modifications and variations are apparent to those skilled in the art.

What is claimed is:

1. A chip for data processing, comprising:
   at least one interface for receipt of an input data stream;
   a plurality of data processing blocks each independently performing an associated data processing function on data derived from the input data stream and providing output data corresponding thereto;
   internal memory means for intermediate storage of data in various stages of processing;
   a plurality of memory channels, each controllable to provide configurable data transfer paths for concurrent transfer of data between selected ones of the plurality of data processing blocks via the internal memory means; and
   a CPU for controlling the plurality of memory channels to effect the pipelined processing of the data derived from the input data stream from the at least one interface among the plurality of data processing blocks.

2. The chip for data processing of claim 1, with the at least one interface for receipt of image input data and wherein the plurality of data processing blocks comprise:
   a discrete cosine transform block (DCT) for transformation of the image input data into DCT coefficients;
   a quantizer for quantizing the coefficients of the DCT; and
   an encoder for variable length coding of the quantized coefficients.

3. The chip for data processing of claim 1, wherein the plurality of memory channels each comprise:
   interfaces for coupling to a selected source within one of internal memory means and the plurality of data processing blocks and a selected destination within an other of the plurality of internal memory means and the plurality of data processing blocks.

4. The chip for data processing of claim 3, wherein the plurality of memory channels each further comprise:
   a programmable address generator for changing an order of the data transferred.

5. The chip for data processing of claim 3, wherein the plurality of memory channels each further comprise:
   a programmable address generator for changing an order of the data transferred and including:
      a first counter for each channel adapted to be decremented for each data unit transferred;
      a second counter adapted to be decremented after the last decrement and before reload of the first counter; and
      an address calculator for adding a first stride value to a current source or destination address for each decrement of the first counter and a second stride value to the current source or destination address for each decrement of the second counter.

6. The chip for data processing of claim 5, wherein the address generator is adapted to reload said first counter and said second counter with predetermined values after their last decrements.

7. The chip for data processing of claim 3, wherein the address generator further comprises:
   a data unit counter to count a number of received data units.

8. The chip for data processing of claim 3, wherein each memory channel further comprises:
   a memory channel status register to indicate whether a transfer has been completed, not been initiated, or is in progress.

9. The chip for data processing of claim 3, wherein each memory channel further comprises:
   a source/destination selection register for indication of whether the channel is operating in source or destination mode.

10. A method for establishing memory channels for transferring data streams between a plurality of data processing blocks and an internal memory means on a data chip, and the method comprising for each memory channel the acts of:
    decrementing a first counter for each data unit transferred;
    adding a first stride value to a current source or destination address for each decrement of the first counter;
    decrementing a second counter after the last decrement and before reload of the first counter; and
    adding a second stride value to said current source or destination address for each decrement of the second counter.

11. The method for establishing memory channels of claim 10, further comprising the act of:
    reloading the first counter and the second counter predetermined values after their respective last decrements.

12. The method for establishing memory channels of claim 10, further comprising the act of:
    counting the number of received data units from a source interface of each of the memory channels.

13. The method for establishing memory channels of claim 10, further comprising the act of:
    storing a status value indicating whether a transfer has been completed, not been initiated, or is in progress for each channel.

* * * * *